United States Patent Office

2,870,201
Patented Jan. 20, 1959

2,870,201

SYNTHESIS OF AMINO ACIDS

Maxwell A. Pollack, Morris Plains, N. J.

No Drawing. Application April 4, 1955
Serial No. 499,225

2 Claims. (Cl. 260—534)

This invention relates to a process of making amino acids. It relates also to certain amino acids not heretofore known and to new intermediate products that are useful in synthesizing amino acids.

Amino acids have long been known as important components of human and animal diet. Lysine, for instance, has been proposed as a supplement for cereal proteins. It is being synthesized by a procedure that is relatively expensive.

My invention provides a process for synthesizing lysine and other known amino acids with good yields and at a satisfactory cost as well as new amino acids and new chemical intermediates.

The starting material for my synthesis is a vinyl allyl ether, that is, vinyl allyl ether itself or substituted products thereof. This ether and its preparation are described by Hurd and the applicant in the J. Am. Chem. Soc. 60, 1905–11 (1938) and J. Org. Chem. 3, 550–69 (1939).

I convert this ether to an aldehyde and then to the desired amino acid by one of several series of steps explained below.

EMBODIMENTS OF THE INVENTION

The invention comprises the following embodiments.

(1) Vinyl allyl ether is heated to convert it to allylacetaldehyde in manner described by me in the said publication. Hydrobromination, in the presence of an oxidizing agent, converts the allylacetaldehyde to 5-bromovaleraldehyde. This is then treated in succession with hydrogen cyanide, sodium or potassium cyanide or the like and then with ammonium carbonate or the equivalent, to give 4-bromobutylhydantoin. Next the bromine is replaced by the $NH_2$ group, as by amination with ammonia, the product being 4-aminobutylhydantoin. This is then converted to lysine in conventional manner as by ammonolysis followed by hydrolysis and purification.

The chain of reactions which I use are the following:

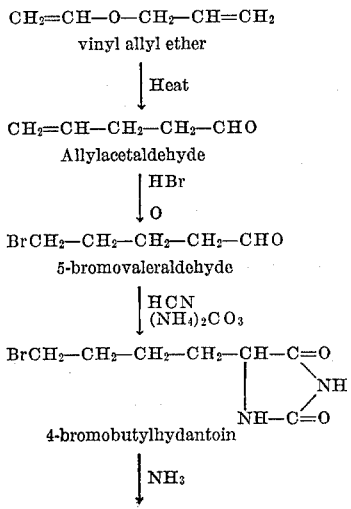

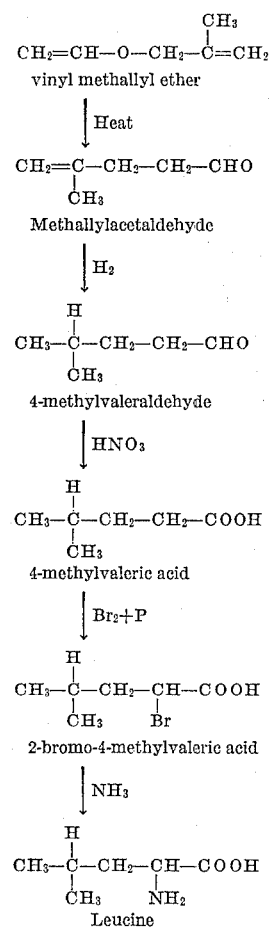

(2) In a second embodiment, the step of hydrobromination in the presence of an oxidizing agent, in the series of reactions given above, is replaced by hydrogenation. This gives a saturated aldehyde, namely n-valeraldehyde. This valeraldehyde, subjected to the cyanide and ammonium carbonate treatment, gives butyl hydantoin. Subjected to the hydrolysis in contact with acid or alkali, the aldehyde gives norleucine.

To make leucine, this same series of reactions is used but the ether started with is vinyl methallyl ether, the aldehyde resulting from the hydrogenation step is oxidized to 4-methylvaleric acid, this acid is brominated to give the alpha bromo derivative, and the bromo derivative is then aminated with ammonia. The product is leucine. The chain of reactions is as follows:

The allylacetaldehyde and the methallyl acetaldehyde are examples of aldehydes containing the group

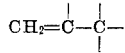

the C of the $CH_2$ group being a terminal carbon.

To give isoleucine the same procedure is followed except that the ether first used is vinyl crotyl ether, (3) In a third embodiment, the hydrobromination and hydrogenation steps of (1) or (2) above are omitted. The products are amino acids which differ from the products of (1) and (2) in being unsaturated. The products are amino acids which are considered to be new as chemical compounds. In this embodiment the unsaturated aldehyde intermediate is subjected to the hydantoin reaction by treatment with hydrogen cyanide and ammonium carbonate or the like, the hydantoin compound is hydrolyzed as above, and the amino acid salt is then purified in a manner usual for saturated amino acid salts.

(4) In a fourth embodiment I make the bromo saturated aldehyde as illustrated in the hydrobromination step of the reactions (1) for lysine above. The 5-bromovaleraldehyde is oxidized to 5-bromovaleric acid with nitric acid or other suitable oxidizing agent. Then I replace the bromine by nitrile —CN as by treatment with potassium cyanide in manner usual for replacing bromine by a nitrile group. Then I hydrogenate in manner to reduce the nitrile to an amino group —NH$_2$. Starting with the 5-bromovaleraldehyde, I thus make the 6-amino caproic acid. This acid is useful in making the polymer for synthetic fibers of the nylon 6 type.

(5) In this embodiment I start with 4,5-dibromovaleraldehyde. I subject this dibromovaleraldehyde to treatment with hydrogen cyanide to give the nitrile and then with ammonium carbonate or the like to give 3,4-dibromobutylhydantoin. This is then treated with excess ammonia, to produce amination. The resulting 3,4-diaminobutylhydantoin is subjected to hydrolysis with acid or alkali to give the salt of 2,5,6-triaminocaproic acid. This salt is treated in manner usual for recovery of amino acids from their acid or alkali salts, as will be illustrated later. The product is a new amino acid.

(6) The 4-bromobutylhydantoin made as described in embodiment (1) is converted from 4-cyanobutylhydantoin by treatment with alkali cyanide and then is subjected to hydrolysis, as with acid or alkali, to convert the nitrile group to the carboxyl group —COOH. The hydantoin is also hydrolyzed at the same time, to give an amino dicarboxylic acid, namely, alpha amino pimelic acid which is considered a new acid. Its formula is

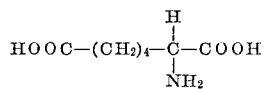

Other embodiments which are included within the invention will be shown by variations from the above in some of the numbered examples given later herein.

Among the new compounds which the invention comprises are all the bromoaldehydes of the classes illustrated above or by the examples; all of the unsaturated ethers serving as the starting material except vinyl allyl ether; and the aldehydes (except allylacetaldehyde) made by heating such ethers.

MATERIALS

The ether which serves as the starting material, in those syntheses in which more advanced intermediates are not available, contains unsaturated aliphatic groups on both sides of the ether oxygen. More specifically, the ether contains a carbon to carbon double bond on a carbon joined to the ether oxygen. On the other side of the oxygen, the ether contains a double bond between carbons spaced from the oxygen by an intervening carbon atom. Examples that illustrate this structure and the class of ethers to be used are vinyl allyl ether, vinyl crotyl ether, vinyl methallyl ether, and other derivatives of the type formula $$CR_2=CH-O-CR_2-CR=CR_2$$

In this formula the several R's represent hydrogen or the same or different ones of the following groups: alkyl, aryl, aralkyl, cycloalkyl, or monovalent heterocyclic groups, examples being $C_1-C_6$ alkyls, phenyl, toluyl, benzyl, cyclopentyl, cyclohexyl, furyl, thienyl, thiazole, and their halogen substitution products. Ordinarily I use only one of the substituted R group on a single carbon atom and in fact only one such substituent group in the entire molecule of the ether.

Those of the unsaturated ethers that are not available are made either by reaction of an acetylene series hydrocarbon with an unsaturated alcohol in contact with the potassium alcoholate of the said alcohol as illustrated at the start of Example 1 below or as described by Hurd and the applicant (loc. cit.). The only variation is that I choose the acetylene series hydrocarbon and the unsaturated alcohol to contain carbon atoms in numbers desired on the two sides of the oxygen in the ether. The alcohol used must contain a double bond spaced at the closest from the alcohol group (OH) by an intervening carbon, as in $CH_2:CH.CH_2OH$.

For reactions involving oxidation, I use oxygen, air, benzoyl peroxide, perbenzoic acid or like oxidizing agent, or combinations thereof.

In hydrogenations I employ catalytic nickel, platinum and like metal catalysts that are known to be accelerators of hydrogenation of aliphatic carbon to carbon double bonds.

In place of the bromine I may use any other halogen. Because of reactivity and cost, the bromine compounds are selected for actual use.

As the acid or alkali for hydrolysis to the amino acid or salt I use acids and alkalies that are usual for like hydrolyses. Examples of acids that may be used are hydrochloric, sulfuric and phosphoric. Examples of alkalies that are satisfactory are the alkaline earth metal and alkali metal introduced if desired as the oxides.

OPERATING CONDITIONS

As to conditions of operation, I convert the selected unsaturated ether, serving as starting material, to the saturated aldehyde as described in the said article, as by heating to about 150° C. to 300° C. and suitably to approximately 225°–275° C. for conversion at a rate that is commercially satisfactory without objectionable pyrolytic decomposition of any of the ether used or aldehyde that results. The heating is continued until substantially no further rearrangement occurs, a few minutes heating at the selected maximum temperature being ordinarily adequate.

The treatment of the resulting aldehyde with hydrogen bromide in the presence of an oxidizing agent is made in a solution in a non-polar solvent such as benzene, toluene, petroleum ether, or naphtha. This hydrobromination in the presence of the oxidizing agent is suitably made at ordinary temperatures or in an ice bath and is continued until substantially no more hydrogen bromide is taken up by the aldehyde.

The conversion of the bromo intermediate to the hydantoin compound is suitably made as follows: the bromoaldehyde 1 mol is mixed with 1 mol of cold anhydrous hydrogen cyanide or equivalent cyanide. On standing for several hours, reaction occurs to form the cyanohydrin. To this cyanohydrin I then introduce ammonia and carbon dioxide, to give ammonium carbonate in aqueous solution. The whole is mixed by stirring and is heated, as at about 50°–60° C., for a few hours until the desired bromobutyl hydantoin is formed. The subsequent amination or ammonolysis is effected by (1) adding aqueous ammonia in large excess and heating at about 50° C. in a pressure vessel for 2–4 days until the bromine is replaced substantially completely by the amine group, (2) the Gabriel synthesis using potassium phthalimide, or (3) ammonium carbonate followed by heating.

The resulting aminoalkyl hydantoin is then hydrolyzed, as by heating with barium hydroxide in aqueous solution in an autoclave at 160° C. until substantially complete hydrolysis is effected. The product is the desired amino acid mixed with barium salts and other impurities.

Purification of the resulting amino acid or its salt is effected by customary technique or as illustrated near the end of Example 1.

In the embodiments involving hydrogenation, I use hydrogen gas under pressure. Thus I may pass the vapors of the aldehyde to be hydrogenated mixed with hydrogen over nickel hydrogenation catalyst.

In making the dibromo aldehydes, I add liquid bromine to the chilled, stirred, unsaturated aldehyde. The bromine is absorbed almost instantly.

When the two bromines so introduced are then replaced by nitrile group and the nitriles reduced by hydrogen to amine groups, I make a diamino acid.

The bromo compounds may also be treated directly with an excess of ammonia under aminating conditions. Diamino acids result when the compound so treated is the dibromo.

Conditions not specifically stated are those that separately are usual for corresponding single steps in other syntheses.

Except as stated specifically to the contrary, proportions used are those required stoichiometrically for the reactions of the kind described in the following examples or previously herein. Excesses of the less costly reactants may be used when an excess does not lead to an objectionable side reaction. When replacing bromine with ammonia by amination, for example, a large excess of ammonia is used not only to improve the yield but also to avoid formation of secondary amines.

The invention will be further illustrated by description in connection with the following specific examples of the practice of it.

Example 1.—Preparation of lysine

Vinyl allyl ether is prepared by passing acetylene into a mixture of allyl alcohol and potassium allylate in an autoclave and heating at around 100° C. until absorption is substantially complete. The reaction mixture is washed and distilled to yield pure vinyl allyl ether.

The vinyl allyl ether is converted into allylacetaldehyde by passing the ether through a tube heated to 260° C. The reaction product is distilled to remove unreacted vinyl allyl ether and the allylacetaldehyde is collected at 103°–4° C.

A solution of 100 parts of the allylacetaldehyde and 3 of benzoyl peroxide is made in 1000 of benzene. This is cooled to 0° C. Into this is passed a gaseous mixture of hydrogen bromide mixed with air, until the weight gain shows that a slight excess of the hydrogen bromide is present above 1 mol for 1 of the aldehyde. The product is then allowed to stand for several hours.

The excess hydrogen bromide is removed by blowing with air. The remainder is distilled, whereupon 5-bromovaleraldehyde is obtained as an oil after the low boilers are removed.

To 1 mol of 5-bromovaleraldehyde well-chilled in an ice bath, there is added a slight excess over 1 mol of ice-cold anhydrous hydrogen cyanide. These materials are well-mixed and allowed to stand for several hours. The excess hydrogen cyanide is then removed by aspiration with a water pump.

The resulting bromoamyl cyanohydrin is then mixed with a solution of 3 mols of ammonium carbonate in 500 ml. of water and heated at 50°–55° C. for two hours. 5000 ml. of concentrated ammonia are then added and the whole heated in a pressure vessel at 60° C. for 4 days. The product is evaporated to dryness in vacuo. It is then dissolved in a solution of 2.5 mols of barium hydroxide in 5000 ml. of hot water, and heated in an autoclave at 160° C. for 30 minutes. It is then cooled, followed by filtration. The excess barium hydroxide is removed by adding ammonium carbonate and filtering off the barium carbonate. The whole is evaporated to dryness in vacuo. The residue is acidified with excess dilute aqueous hydrochloric acid and evaporated again to dryness in vacuo. The residue consists of a mixture of crude dl-lysine dihydrochloride and ammonium bromide. From this, the lysine is separated as the picrate and then converted to the dihydrochloride. This product is converted to free dl-lysine by treatment with the calculated quantity of silver oxide. The dl-lysine may be separated into the optically active isomers by mixing with l-glutamic acid and crystallizing out the l-lysine l-glutamate after addition of methanol to the solution.

In a modification of this example, vinyl methallyl ether is substituted in equimolar proportion for the vinyl allyl ether. The final product obtained is 2,6-diamino-5-methylcaproic acid.

Likewise vinyl cinnamyl ether is used instead of vinyl allyl ether. The final product obtained is 2,6-diamino-5-phenylcaproic acid.

Example 2.—2,7-diaminopelargonic acid 4-bromobutyl hydantoin is prepared by heating the bromoamyl cyanohydrin of Example 1 with a 2 molar proportion of aqueous ammonium carbonate for one hour at 55°. It is decolorized with charcoal and recrystallized from hot water.

The 4-bromobutyl hydantoin is heated with a slight excess of aqueous potassium cyanide. 4-cyanobutyl hydantoin is formed. This compound is separated and purified, and then subjected to hydrogenation in methanol solution containing some ammonia, using Raney nickel catalyst, an initial pressure of 10 to 100 atmospheres of hydrogen and a temperature of 100° C. This yields 5-aminoamyl hydantoin. When this compound is hydrolyzed with hot aqueous barium hydroxide, and purified in the usual way, 2,7-diaminopelargonic acid results.

A portion of the 4-cyanobutyl hydantoin is heated under pressure with concentrated aqueous hydrochloric acid, whereupon hydrolysis to the hydrochloride of alpha-amino-pimelic acid occurs. This is converted to free alpha-amino-pimelic acid by treatment with the theoretical amount of silver oxide.

As an alternative for pressure hydrogenation of the nitrile group as described, I may substitute hydrogenation by means of borolithium hydride or other metal hydride used in manner conventional for such hydrogenation.

Example 3.—Aminocaproic acid 5-bromovaleraldehyde is oxidized with fuming nitric acid to 5-bromovaleric acid. After the reaction, the excess nitric acid is removed by distillation under reduced pressure, after which the bromovaleric acid distilled. On cooling, it solidifies to white crystals. Other methods of carrying out this oxidation include catalytic oxidation using oxygen or air and reaction with chromic acid.

5-bromovaleric acid (1 mol) is mixed with 300 ml. of water, and 0.5 mol. of sodium carbonate added slowly with stirring. Sodium cyanide (1.1 mols) is then added with shaking, and the whole heated to 55° C. After holding at this temperature for one hour, the temperature is raised to 100° C. for 5 minutes. The reaction mixture is cooled and acidified with concentrated hydrochloric acid. The free excess HCN is removed under reduced pressure at room temperature. The reaction mixture is then saturated with ammonium sulfate and extracted with ether. The ether solution is dried and distilled, yielding 5-cyanovaleric acid.

The 5-cyanovaleric acid is converted to the potassium salt and dried. One-tenth mol of this salt is hydrogenated with Raney nickel in ammoniacal methanol at 100° C. under an initial pressure of 100 atmospheres for 2 hours. After the reaction, the catalyst is filtered off, and the solvent is distilled in vacuo. The residue is taken up in water, and excess acetic acid added. The whole is taken to dryness again in vacuo. The residue is washed with dry ethanol, giving 6-aminocaproic acid.

The procedure of this example is followed using, as the starting aldehyde, 5-bromo-4-methylvaleraldehyde, obtained by rearranging vinyl methallyl ether to methallylacetaldehyde and hydrobrominating as in Example 1. The final product obtained is 6-amino-4-methylcaproic acid (6-amino-isopelargonic acid).

Example 4.—5 aminovaleric acid

Six grams of 5-bromovaleric acid is placed in a 200 ml. pressure bottle, to which 160 ml. of concentrated ammonia is then added. The bottle is closed and heated at 60° C. for four days. At the end of this time, the bottle is opened, and the contents evaporated to dryness. This yields a mixture of 5-aminovaleric acid and ammonium salts, which can be separated by ordinary techniques.

Example 5.—Proline

One mol of 5-bromovaleric acid is mixed with 3 grams of phosphorus trichloride and 1 mol of bromine is added. The whole is heated with stirring at 60°–100° C. until the reaction is complete. The reaction product is washed with hot water and distilled to give 2,5-dibromovaleric acid.

The 2,5-dibromovaleric acid is placed in a pressure vessel together with a large excess of ammonia and heated at 70° C. for three days. At the end of this time, the reaction mixture is cooled and the contents evaporated to dryness. The mixture of dry salts is worked up in the usual way, the major product being proline (2,5-iminovaleric acid).

Example 6.—Dehydronorleucine

One mol of allylacetaldehyde is treated with a concentrated aqueous solution of 1 mol of sodium bisulfite. This mixture is stirred at room temperature and then a solution of 1 mol of potassium cyanide in 80 ml. of water is added slowly. Stirring at room temperature is carried out for 2 hours. The upper layer is separated, and the lower layer extracted with ether. The ether is distilled off and the residue combined with the upper layer. This is added to a solution of 2 mols of ammonium carbonate in 400 ml. of water. The whole is stirred 1 hour at 50°–55° C. and then raised to boiling water temperature. A little charcoal is added, the whole filtered, and the filtrate evaporated to dryness on a water bath.

The resulting hydantoin is hydrolyzed by heating with concentrated aqueous hydrochloric acid, yielding a solution of the hydrochloride of alpha-aminohexen-5-oic acid (dehydronorleucine). This is purified in the usual way.

The procedure of this Example 6 is followed using methallylacetaldehyde instead of allylacetaldehyde. The final product obtained is alpha-amino-5-methylhexen-5-oic acid.

The procedure of this example is followed using 2-fluoroallylacetaldehyde, obtained by heating vinyl 2-fluoroallyl ether, instead of allylacetaldehyde. The final product obtained is alpha-amino-5-fluoro-hexen-5-oic acid.

Example 7.—Norleucine

Allylacetaldehyde is hydrogenated to n-valeraldehyde by passing vapors of the unsaturated compound mixed with excess hydrogen over an active nickel catalyst in a reaction chamber heated to 160°–170° C.

The normal valeraldehyde is converted into alpha-aminocaproic acid (norleucine) by the hydantoin step essentially as described in Example 6.

Example 8.—Isoleucine

Vinyl crotyl ether is made in a manner similar to vinyl allyl ether, using acetylene, crotyl alcohol, and potassium crotylate.

When vinyl crotyl ether is heated at 260° C., it undergoes rearrangement to produce 3-methyl-penten-4-aldehyde. This is hydrogenated as in the previous example to give 3-methylvaleraldehyde.

3-methylvaleraldehyde is oxidized with fuming nitric acid to 3-methylvaleric acid. This is separated from the oxidation mixture by distillation, and then brominated in the presence of red phosphorus to produce alpha-bromo-3-methylvaleric acid. This compound is heated with a large excess of ammonia in a pressure bottle at 60° C. for two days, whereupon the bromine atom is replaced by the amino group. On working up the reaction mixture pure dl-isoleucine is obtained.

Example 9.—Leucine

Vinyl methallyl ether is made in a manner similar to vinyl allyl ether, using acetylene, methallyl alcohol, and potassium methallylate.

When vinyl methallyl ether is heated at 260° C., it undergoes rearrangement to produce methallylacetaldehyde (4-methyl-penten-4-aldehyde). This is hydrogenated as in the previous example to give 4-methylvaleraldehyde.

4-methylvaleraldehyde is oxidized with fuming nitric acid as in the previous example to yield 4-methyl-valeric acid. This is brominated in the presence of red phosphorus to yield alpha-bromo-4-methylvaleric acid. This compound is aminated by heating with ammonia as in the previous example to give dl-leucine.

Example 10.—4,5-diaminovaleric acid

One mol of allylacetaldehyde is chilled in an ice water bath and stirred while one mol of bromine is added slowly. The bromine is taken up instantly by the aldehyde, and the product formed is predominantly 4,5-dibromovaleraldehyde.

One mol of 4,5-dibromovaleraldehyde is oxidized by fuming nitric acid to form 4,5-dibromovaleric acid. The nitrogen oxides and excess nitric acid are removed by distillation, and the dibromovaleric acid is mixed with a large excess of ammonia. This aqueous ammoniacal solution is held in a closed system 50°–60° C. for four days and then worked up as previously indicated. The major product is 4,5-diaminovaleric acid.

Example 11.—2,5,6-triaminocaproic acid 4,5-dibromovaleraldehyde is converted to the hydantoin by the procedure of Example 1. This 3,4-dibromobutylhydantoin is then mixed with excess ammonia (concentrated) and heated at 60° C. in a pressure vessel for four days. When the resultant product is hydrolyzed and purified, it is converted to 2,5,6-triaminocaproic acid.

Example 12.—Aminoproline

One mol of 4,5-dibromovaleric acid is brominated by treatment with one mol of liquid bromine at 60°–100° C. in the presence of phosphorus trichloride as catalyst. In this way 2,4,5-tribromovaleric acid is obtained. When this compound is heated in a pressure vessel with a large excess of ammonia at 70° C. for three days, it is converted into 2,5-imino-4-aminovaleric acid (aminoproline).

By treatment with nitrous acid, aminoproline can be converted into hydroxy nitrosoproline, which by acid hydrolysis is finally converted into hydroxyproline.

USES FOR THE NEW AMINOACIDS

Those of the aminoacids that I make that are old are useful as at present utilized.

The new aminoacids are useful as ingredients of foods or feeds and also as follows.

1. Polymers

The amino acids may be polymerized to form high-molecular weight polyamides or polypeptides in a variety of ways. First they may be heated as such and thus caused to polymerize. Such polymerization is particularly successful with amino acids of the class of 6-aminocaproic acid which, in this manner, can be made to yield the textile material nylon-6.

The amino acids may also be converted to derivatives which readily undergo polymerization. Thus, an alpha-amino acid, such as norleucine, may be converted to the n-carboxy anhydride as by reaction with carbobenzoxy chloride

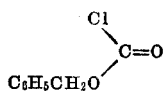

followed by treatment with thionyl chloride and heating in vacuo. The resulting n-carboxy anhydride is polymerized by heating or on treatment with catalysts, to yield high molecular polyamides.

Other derivatives of the amino acids may be polymerized if desired. These include esters, amides, peptides, and the like.

6-amino-4-methylcaproic acid, for example, is heated for one-half hour at 220°–230° C. in a nitrogen atmosphere at ordinary pressure. Vacuum is then applied, slowly reducing the pressure to 1 mm. of mercury or less. Heating is continued for four hours at 225°–230° C., followed by 15 minutes at 250° C. The final product is a high molecular weight polyamide, which solidified on cooling.

The amino acids may be copolymerized with each other or with diamines or dicarboxylic acids, or both.

The polyamides obtained can be used for a variety of useful purposes. These include making into textile fibers or filaments, extruded products such as rods and tubes, injection and compression molded products, films, coatings for fabrics, and foamed products.

2. Surface-active agents

The amino acids may be used as surface active agents. Also they may be reacted with fatty acyl halides, fatty acids, or other groups to give the proper balance of hydrophobic and hydrophilic structures, for use as wetting agents, emulsifiers, solubilizers, defoamers, and the like.

SEPARATION OF OPTICAL ISOMERS

The alpha-amino acids and most of the other amino acids described herein exist in optically active forms. If desired, these may be separated into the enantiomorphic isomers by one or more of the customary techniques. Thus the separation may include fractionation of brucine or quinine salts or of l-glutamates and like salts of the amino acids. Other separation techniques include selective enzymatic hydrolysis, as with papain, chymotrypsin, or carboxypeptidase on the amino acid, its ester, or other derivative serving as a suitable substrate.

It will be understood that it is intended to cover all changes and modifications of the examples of the invention herein chosen for the purpose of illustration which do not constitute departures from the spirit and scope of the invention.

What I claim is:

1. In making lysine by heating 1 mole of vinyl allyl ether at a temperature of about 150°–300° C., continuing the heating at the said temperature until allylacetaldehyde is produced, hydrobrominating the resulting allylacetaldehyde $CH_2=CH-CH_2-CH_2-CHO$ to form a saturated bromoaldehyde, mixing the said bromoaldehyde with at least a stoichiometric proportion of hydrogen cyanide to give a bromocyanohydrin, mixing therewith at least stoichiometric proportions of ammonium and carbonate ions, maintaining contact of the bromocyanohydrin with the said ions until the bromocyanohydrin is changed to the corresponding bromohydantoin, mixing the bromohydantoin with at least the stoichiometric proportion of ammonia until the bromine of the bromohydantoin is replaced by the amino group $NH_2$, and heating the resulting aminohydantoin in contact with water to cause hydrolysis of the aminohydantoin to lysine, the improvement which comprises effecting the said hydrobromination by reacting the allylacetaldehyde with at least approximately the stoichiometric proportion of hydrogen bromide in contact with an oxidizing agent selected from the group consisting of oxygen and organic peroxy compounds until the combination between the unsaturated aldehyde and the hydrogen bromide is substantially complete, the hydrobromination under these conditions causing the bromine to become attached to the terminal carbon atom originally joined to two hydrogens and the hydrogen of the hydrogen bromide to become attached to the carbon atom adjacent to the said terminal carbon atom, to give 5-bromovaleraldehyde.

2. The process of making a saturated bromoaldehyde which comprises maintaining an unsaturated aldehyde of the formula $CH_2=CH-R-CHO$, in which R is an alkylene group, in contact with at least approximately the stoichiometric proportion of anhydrous hydrogen bromide and an oxidizing agent selected from the group consisting of oxygen and organic peroxy compounds until the combination between the said aldehyde and the hydrogen bromide is substantially complete, the hydrobromination so effected causing bromine to be attached in predominating proportion to the terminal carbon originally joined to the 2 hydrogen atoms and the hydrogen of the hydrogen bromide to be attached to the carbon adjacent to the said terminal carbon.

References Cited in the file of this patent
UNITED STATES PATENTS

| | | |
|---|---|---|
| 2,391,799 | Rogers | Dec. 25, 1945 |
| 2,501,708 | Bewley et al. | Mar. 28, 1950 |
| 2,527,366 | Livak et al. | Oct. 24, 1950 |

FOREIGN PATENTS

| | | |
|---|---|---|
| 576,435 | Great Britain | Apr. 3, 1946 |

OTHER REFERENCES

Helferich et al.: Chem. Abs., vol. 15 (1921), p. 1302.
Hurd et al.: Jour. Am. Chem. Soc. 60, 1905–11 (1938).
Karrer: Org. Chem., 2nd ed., page 122 (1946).
Beilstein: Organische Chemie, 2nd Supp. (1941), p. 736.
Paul: Chem. Abs., vol. 38 (1944), page 4907.
Weygand: Organic Preparations (1945), page 66.
Noller: Chemistry of Organic Compounds, pub. by Saunders and Company (1951), p. 52, 122.